Feb. 21, 1939.  J. B. WURTZEL  2,148,003
BUTTER MOLD
Filed April 28, 1937  2 Sheets-Sheet 1
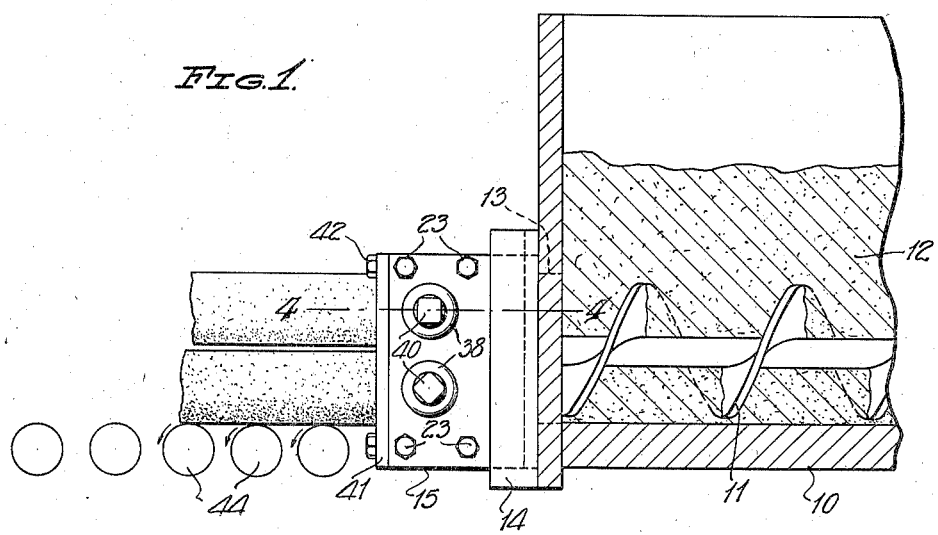
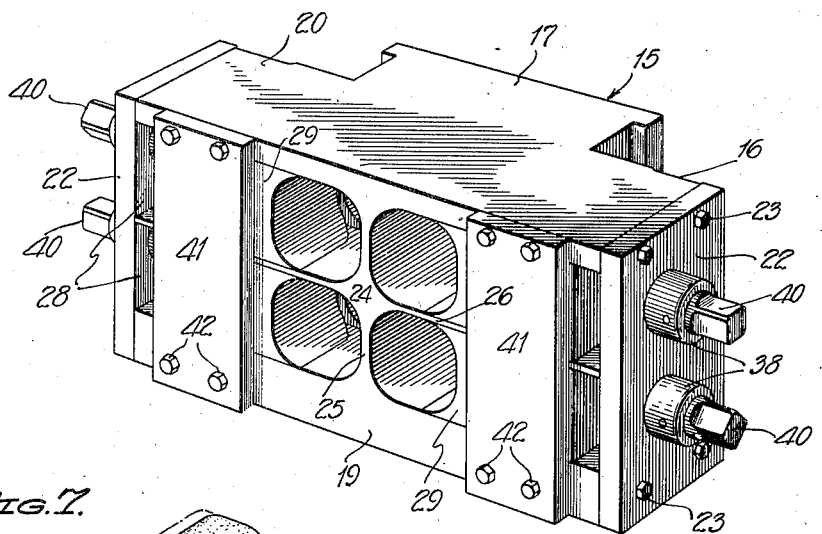
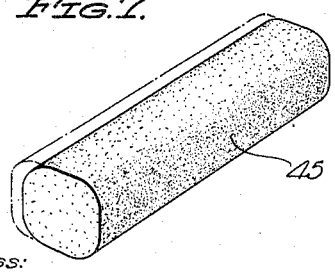
JACOB B. WURTZEL.
INVENTOR.
BY Ely + Pattison
ATTORNEYS.

Feb. 21, 1939.         J. B. WURTZEL         2,148,003
BUTTER MOLD
Filed April 28, 1937         2 Sheets-Sheet 2
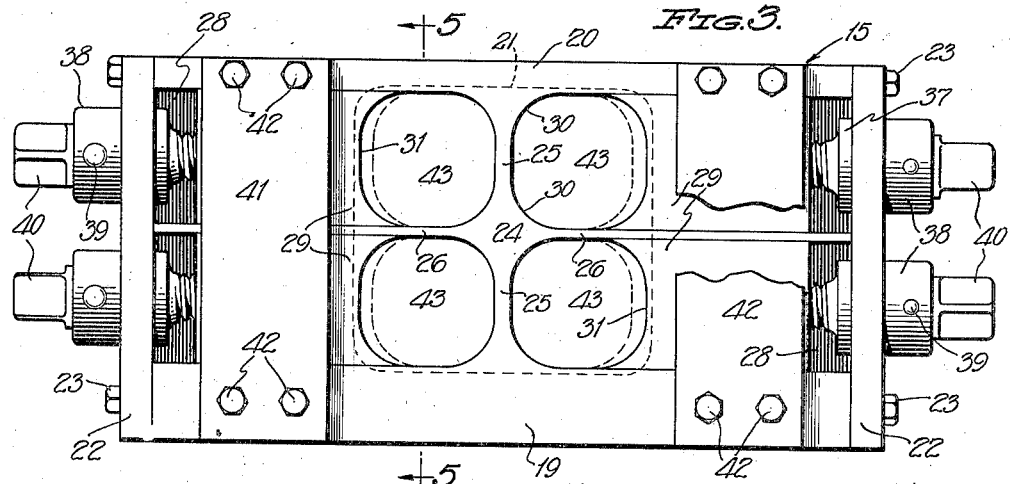
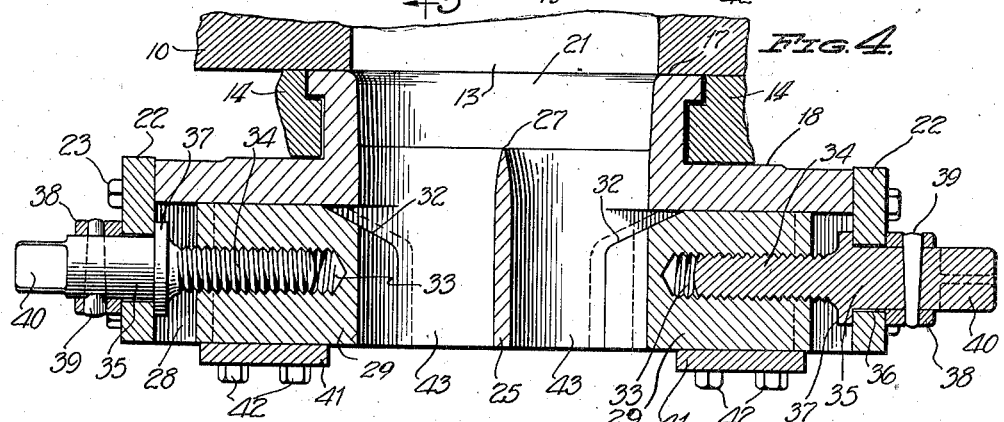
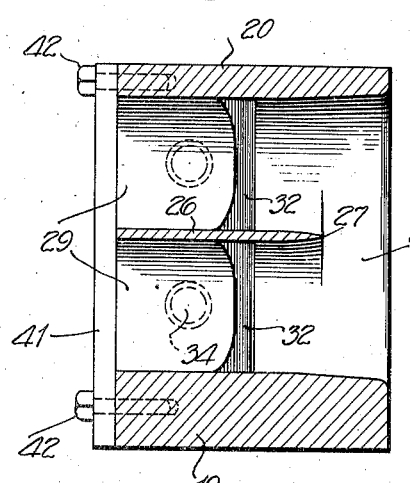
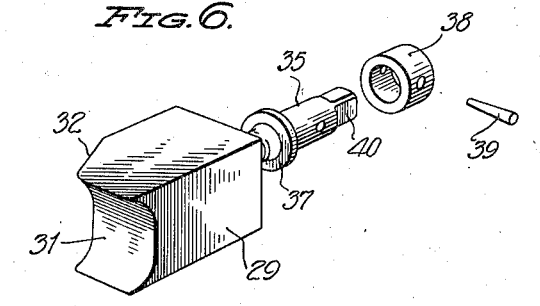
JACOB B. WURTZEL.
INVENTOR.
BY *Ely & Pattison.*
ATTORNEYS.

Patented Feb. 21, 1939

2,148,003

UNITED STATES PATENT OFFICE 2,148,003

BUTTER MOLD

Jacob B. Wurtzel, Bridgeport, Conn.

Application April 28, 1937, Serial No. 139,413

5 Claims. (Cl. 31—14)

This invention relates to improvements in butter molds for use in connection with butter print machines.

The main purpose of the invention is to provide a butter mold to be substituted for the style of butter mold now used on machines for producing print butter without necessitating changes in machine design, whereby a plurality of bars of butter may be formed simultaneously and thereafter cut into proper length for individual packaging.

In the retail sale of print butter, it is customary to package the same in pound lots, which practice is satisfactory for use in families where a pound of butter is rapidly consumed, but purchasing of such amounts of butter for individual use or for instant consumption is not economical to such types of purchasers. It is therefore the purpose of this invention to provide a butter mold which will permit packaging of butter in small quantities for individual or immediate consumption in bar form for sale at a set market price. Due to the varying change in the price of butter, it becomes necessary to correspondingly vary the weight of the butter bar in order that the set selling price of the same may be maintained and for meeting this condition, I provide a butter mold which enables the varying of the cross sectional size of the butter bar without effecting change in length thereof. This permits the printing of labeled wrappers of a uniform length, and of a width to meet the varying cross sectional area of the butter bar, and avoids the printing of different size label wrappers to meet the varying size of the bar, which size is determined by the prevailing market price of butter.

A further feature of the invention is to provide a butter mold which is simple and inexpensive of construction, and which may be easily cleaned to fully meet the sanitary requirements of devices of this kind.

With these and other objects in view, the invention resides in the novel construction, combination and arrangement of parts, the essential features of which are hereinafter fully described in the following specification, are pointed out particularly in the appended claims, and are illustrated in the accompanying drawings, in which:

Figure 1 is a fragmentary vertical sectional view through a print butter feeding machine showing my improved butter mold in position thereon.

Figure 2 is a perspective view of the butter mold per se.

Figure 3 is a front elevational view of the butter mold with a part broken away.

Figure 4 is an enlarged horizontal sectional view on the line 4—4 of Figure 1, the dotted line indicating a forward adjusted position of the adjustable mold block.

Figure 5 is a vertical transverse sectional view on the line 5—5 of Figure 4.

Figure 6 is a detail perspective view of one of the adjustable mold blocks and its associated adjusting means, the latter being in separated condition.

Figure 7 is a perspective view of a bar of butter formed by my improved butter mold, the dotted lines indicating the shape of the butter bar when the cross sectional area is increased.

Referring to the drawings by reference characters, the numeral 10 designates a fragmentary portion of the butter feed screw box of a butter feed machine, the same having a rotatable screw 11 at the bottom thereof which serves to feed butter 12 from the box 11 through the outlet 13 provided in one of the walls of the box. Carried by the screw box 10 at the outlet 13 is a mold holding bracket 14 which removably supports my improved butter mold designated in its entirety by the reference character 15.

The butter mold 15 includes a rectangular shaped body 16 having a reduced attaching head 17 extending from the rear thereof, the said head being slidably received in the supporting bracket 14. The body 16 further includes a vertical rear wall 18, a forwardly extending horizontal bottom wall 19, and a top wall 20 substantially parallel to the bottom wall 19. A relatively large substantially square inlet opening 21 is provided in the head 17, and the said opening 21 registers with the outlet opening 13 of the feed screw box 10. Plates 22 are bolted to the ends of the top and bottom walls 19 and 20, and constitute vertical side walls, the securing bolts being designated at 23.

Formed integral with the rear, top and bottom walls of the body, and disposed forwardly of the inlet opening 21, is a cruciform partition 24, the same including a vertical partition wall 25, and a horizontal partition wall 26. The cruciform partition 24 is located centrally with respect to the inlet opening 21, and the inner edges of the partition 24 taper to a point as at 27 to prevent backing up of butter against said edges when the same is extruded through the mold by the action of the feed screw 11.

The cruciform partition 24 divides the body 16 into four separate compartments 28, and slidably mounted in the respective compartments 28 for movement toward and away from the vertical partition 25 are mold blocks 29. Each block 29 and actuating mechanism therefor is identical in construction and a description of one will suffice for the others. The corners of the cruciform partition 24 are rounded as at 30 and the inner face of each block 29 is of a shape corresponding to that of the vertical partition 25 with which it is slidably associated.

The working or mold face of the block 29 is designated 31 and the inner side face of the block 29 is beveled from the face 31 as at 32 so as to provide an angular face against which the butter is forced in its passage past each block 29. Extending inwardly from the outer end of each block 29 is a threaded bore 33 which threadedly receives the screw threaded shank 34 of an adjusting screw 35, the screw 35 being rotatably mounted in an opening 36 provided in the end wall 22. The adjusting screw 35 is provided with a flange 37 which abuts the inner side of the wall 22 while a collar 38 telescopes the screw 35 and abuts the outer side of the wall 22, the collar being secured to the screw by a tapered pin 39. By this construction each screw 35 is swivelly mounted in an end wall 22. The extreme outer end of the screw 35 is provided with a square head 40 to which a wrench or other instrument may be applied for rotating the screw to effect an adjustment of the block 29. For the purpose of guiding the blocks in their sliding movement, vertical guide plates 41 extend across the front of the body 16 from the bottom wall 19 to the top wall 20, said plates being fastened by bolts 42.

From the foregoing description, it will be seen that by actuating the screws 35, the blocks 29 may be adjusted with respect to the vertical partition wall 25, and in Figure 4 of the drawings, the full lines indicate the blocks 29 as having their mold faces 31 in alinement with the side walls of the inlet opening 21. In this position, the maximum adjustment is obtained, but by turning the screws to move the blocks 29 inwardly such as shown in dotted lines in Figure 4, the butter passages 43 of the mold may be reduced, thus correspondingly reducing the cross sectional area of the butter extruded through the passages.

In Figure 1 of the drawings, there is shown bars of butter being extruded through the passages 43 of the mold 15, the said bars being received upon conveyor rollers 44 after leaving the mold 15. It will be understood that after passing over the rollers 44, the bars of butter pass onto a butter cutter which cuts the bars transversely into predetermined lengths.

In Figure 7 of the drawings, I have illustrated one of the butter bars 45 produced by the mold, the dotted lines indicating an increased size bar of the same length but different cross sectional area. As previously stated, this varying of the cross sectional size of the butter bar is obtained by effecting adjustment of the blocks 29.

By use of the mold herein shown and described, it is possible to package individual bars of butter such as shown in Figure 7 and place the same upon the market for a set predetermined price, and any variance in the market price of butter may be compensated for by varying the cross sectional size of the butter bar.

By maintaining the length of the butter bar regardless of the cross sectional size of the bar, it is possible to produce label wrappers of uniform length and of the proper width to enable wrapping of the bars within the range of variance of the cross sectional area of the bar.

By reason of the novel construction and arrangement of the parts, the mold may be thoroughly cleaned when necessary to maintain the same in a sanitary condition.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:

1. A butter mold from which butter is adapted to be extruded in bar form by the pressure action of a butter feeding machine comprising a mold body having a butter inlet at the rear thereof, a cruciform shape partition at the front of said body providing four separate compartments in open communication with said butter inlet, obstruction blocks slidably mounted in the respective compartments and cooperating with the walls thereof to provide four separate butter outlets, and means for individually securing said blocks in set adjusted position against sliding movement.

2. A butter bar forming mold adapted to be mounted at the feed outlet of a butter feeding machine comprising a body having an opening therethrough, a partition overlying the front of said opening to divide the same into separate butter outlets, blocks slidably supported by said body and disposed in said outlets for regulating the cross sectional area of said discharge outlets, and adjusting screws swivelly mounted in said body and threadedly connected to the respective blocks.

3. A butter bar forming mold adapted to be mounted at the feed outlet of a butter feeding machine comprising a rectangular shape rear wall having a centrally located inlet opening therein, a top wall, a bottom wall, end walls, a cruciform partition located centrally with respect to said inlet opening and extending to said top, bottom, and end walls to provide separate compartments, obstructing blocks slidably mounted in the compartments and movable toward and away from the vertical section of said cruciform partition, and adjusting screws swivelly mounted in said end walls and having threading engagement with the respective obstructing blocks.

4. A butter bar forming mold through which butter is adapted to be extruded comprising a rear wall having an unobstructed opening therein, a top wall, a bottom wall, end walls, a cruciform partition integral with said top, bottom and rear walls and located forward of and disposed across said opening to provide a series of separate outlet passages, blocks slidably supported within said passages for obstructing portions thereof, and screw means for imparting sliding movement to said blocks to effect adjustment of the same and to hold the blocks in adjusted position.

5. A butter mold from which butter is adapted to be extruded in bar form by the pressure action of a butter feeding machine comprising a mold body having a butter inlet at the rear thereof, a partition fixedly supported by said mold body and disposed forwardly of said inlet to provide separate compartments in open communication with said inlet, obstruction members slidably mounted in the respective compartments and cooperating with the walls thereof to provide separate butter outlets, and means for individually securing said members in set adjusted position against sliding movement.

JACOB B. WURTZEL.